United States Patent [19]

Pradelle

[11] Patent Number: 5,359,886
[45] Date of Patent: Nov. 1, 1994

[54] DEVICE FOR WARNING OF TIRE UNDERINFLATION BY CREATING IMBALANCE

[75] Inventor: Antoine Pradelle, Cournon-D'Auvergne, France

[73] Assignee: Compagnie Generale Des Etablissements Michelin - Michelin & Cie, Clermont-Ferrand Cedex, France

[21] Appl. No.: 995,043

[22] Filed: Dec. 22, 1992

[30] Foreign Application Priority Data

Dec. 23, 1991 [FR] France ................. 91 16154

[51] Int. Cl.⁵ .................................... B60C 23/02
[52] U.S. Cl. .................... 73/146.2; 73/146.5; 116/34 R; 340/447; 340/446
[58] Field of Search ............... 73/146.3, 146.2, 146.4, 73/146.5, 146.8; 116/34 R; 340/442, 443, 446, 447, 448

[56] References Cited

U.S. PATENT DOCUMENTS

| | | | |
|---|---|---|---|
| 3,129,690 | 4/1964 | Nygard | 116/34 R |
| 3,756,190 | 9/1973 | Kendall | 116/34 R |
| 4,082,056 | 4/1978 | Eaton | 116/34 R |
| 4,742,712 | 5/1988 | Kokubu | 73/146.5 |
| 4,943,798 | 7/1990 | Wayne | 340/446 |

FOREIGN PATENT DOCUMENTS 3541494 11/1985 Germany.

*Primary Examiner*—Donald Woodiel
*Attorney, Agent, or Firm*—Oblon, Spivak, McClelland, Maier & Neustadt

[57] ABSTRACT

Device (1, 2, 3, 4) for warning of the under-inflation of a tire, mounted on the wheel of the tire, includes a stationary element (10, 71) with two inner chambers (11, 12, 73, 74), one (11, 73) of which is brought to the inflation pressure, the other (12, 74) to the atmospheric pressure, and a centrifugal mass (20, 72). A blocking device (30, 90) blocks any displacement of centrifugal mass (20, 72) when the inflation pressure is greater than a certain threshold and frees the centrifugal mass (20, 72) when the inflation pressure decreases below the inflation threshold. Centrifugal mass (20, 72) can then become off-centered under the effect of centrifugal forces and creates a dynamic imbalance able to be sensed by the driver of the vehicle.

20 Claims, 6 Drawing Sheets

DEVICE FOR WARNING OF TIRE UNDERINFLATION BY CREATING IMBALANCE

BACKGROUND OF THE INVENTION

1. Field of the Invention

The present invention relates to devices for monitoring tires. More particularly, it relates to a device which is simple and not very expensive, for warning of the under-inflation of a tire.

2. Description of the Background Art

Many devices have been offered to warn the driver of a vehicle of a pressure drop inside one of his tires. Most of these devices use sensors placed in the rim of the wheel for measuring pressure and/or temperature. These sensors transmit their measurements continuously, or when a threshold is crossed, to a central control package. Such devices are described in applications WO 87/00127, DE 2 923 258 or U.S. Pat. No. 4,052,696, for example. The necessity, in all these devices, to reliably transmit the measurements of the sensors located in the rotating wheel to the chassis of the vehicle, leads to high-cost systems reserved for high-price vehicles.

A simpler device is described by patent application DE 3 541 494. Its principle consists in using, to warn of the pressure drop, the change of the vibratory behavior of the wheel when the inflation pressure of the tire decreases, by means of a vibration sensor placed in the vicinity of the wheel-carrier. Unfortunately, the complexity, and the gradual nature of the change in this vibratory behavior of the wheel with the inflation pressure of the tire, causes a low sensitivity of this device. Moreover, its calibration varies as a function both of the type of tire and the type of vehicle.

SUMMARY OF THE INVENTION

The present invention has as an object to eliminate the drawbacks mentioned above by means of a device for warning of the under-inflation of a tire which does not require measuring signals to be transmitted between the wheel and the chassis of the vehicle, while offering great sensitivity.

The invention has as a further object a device for warning of the under-inflation of a tire, which is simple, not very expensive and easily adaptable to all current motor vehicles.

This device, to be mounted on the wheel of the tire, creates an imbalance in the wheel when the inflation pressure of said tire is below a given threshold. The creation of this imbalance causes, while driving, the appearance of vibrations of great amplitude at the wheel, which, via the chassis, suspension and steering of the vehicle, will warn the driver of the existence of under-inflation.

More particularly, this device comprises a means of off-centering a centrifugal mass when the inflation pressure is below a given threshold. In an embodiment of this device, the off-centering means comprises a stationary element having two chambers separated by a centrifugal mass. The first of the chambers is connected to the tire and has a pressure equal to the inflation pressure of the tire, and the second is at atmospheric pressure. A means is provided for blocking the centrifugal mass such that it is blocked when the inflation pressure of the tire is greater than a given threshold and is freed to be able to become off-centered when the inflation pressure is less than the threshold. Moreover, centrifugal mass has, in a plane including the axis of displacement, a U-shaped straight section.

The blocking means of the centrifugal mass comprises at least one ball, placed in the wall of the centrifugal mass which extends along the axis of displacement, and with a diameter greater than the thickness of the wall. The housing makes it possible for the ball to move so as to be tangent to either the inside or outside surface of the wall of the centrifugal mass.

At least one recess is made in the wall of the stationary element at such a position that the ball can be embedded in the recess when the centrifugal mass is flattened against the bottom of the stationary element on the side of the atmospheric chamber and when said ball is tangent to the inside surface of the wall of said centrifugal mass.

An elastic membrane is connected in an airtight manner to the end of the centrifugal mass, on the side of the chamber whose internal pressure is the inflation pressure, and is ended by a blocking part whose outside geometry is suited to that of the bottom of the centrifugal mass. The blocking part has a height such that, when it is placed against the bottom of said centrifugal mass, it covers the housing of the ball.

While driving, the freed centrifugal mass will, under the action of centrifugal forces, quickly become off-centered and thus create a dynamic imbalance in the wheel.

In a modification of the preceding embodiment of the invention, the device for warning of the underinflation of a tire includes a means for limiting the inflation pressure of said tire during inflation.

The means for limiting the inflation pressure during inflation is characterized in that the blocking part of the centrifugal mass rests on the end of a rod whose other end has a needle valve for closing of the duct for intake of the inflation air of the tire, and thus blocks said duct when the inflation pressure reaches the nominal pressure of said tire. This makes it possible to assure a reliable and simple inflation to the nominal pressure of the tire.

A second modification of the invention comprises a means for warning of the freeing of the centrifugal mass. The advantage of this is that it makes it possible, upon stopping, to warn the driver of the vehicle of the under-inflation of one of his tires by a simple visual examination of the device or by an internal alarm depending on the nature, known in the art, of the means of warning selected.

The mounting of any of the preceding devices for warning of the under-inflation of a tire on the wheel disk of said tire is selected such that when the centrifugal mass is in blocked position, the center of gravity of said device is placed on the rotational axis of the wheel of said tire.

A second embodiment of a device for warning of the under-inflation of a tire according to the invention is characterized in that the off-centering means comprises a tubular stationary element placed spirally around a point 0 in which a mobile element can be displaced and which is connected, at its end closest to said point 0, to a chamber connected to the tire and having a pressure equal to the inflation pressure of said tire; and a means for blocking said centrifugal mass such that said centrifugal mass is blocked when the inflation pressure of the tire is greater than a given threshold, and is freed so as to be able to become off-centered when the inflation pressure is less than said threshold.

This second embodiment has the advantage of being mechanically simpler and easier to install on a wheel than the preceding one. A final characteristic of the invention is the use of any of the preceding devices in combination with a vibration sensor placed on the wheel-carrier of the wheel. By "wheel-carrier" is meant the part which actually carries the wheel without any coupling other than the rotation of the wheel bearing.

The under-inflation warning system thus constituted is simple, inexpensive, reliable and has a great sensitivity. Actually, the sudden appearance of a dynamic imbalance when the inflation pressure decreases below a given threshold is easily detected by the vibration sensor. This system thus is free of the complexity of the change in the vibratory behavior of the wheel with the variation of the inflation pressure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
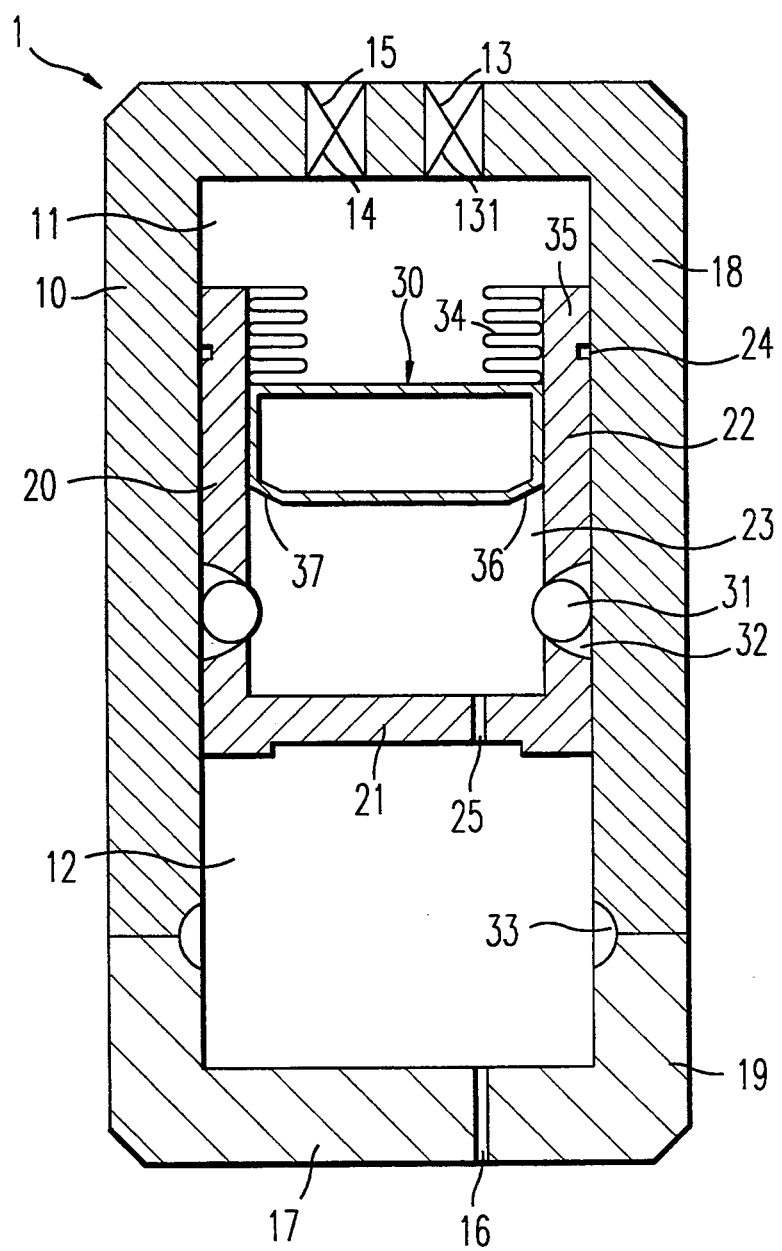
FIG. 1 is an axial view in section of an under-inflation warning device, the tire not being inflated.

An embodiment of the invention is shown in FIG. 1. Under-inflation warning device 1 comprises a stationary housing element 10, a mass which can be moved by centrifugal force (centrifugal mass) 20 and a means 30 for blocking said centrifugal mass 20.

Stationary element 10 is cylindrical and has an internal cavity in which centrifugal mass 20 is movably positioned. This centrifugal mass 20 separates said internal cavity into two chambers 11 and 12. Chamber 11 is pneumatically connected to the internal volume of the tire by duct 13. It is therefore pressurized to the inflation pressure of said tire. Chamber 12 is connected to the atmosphere by duct 16. Its internal pressure is therefore continuously the atmospheric pressure.

Device 1 can optionally be used to inflate the tire. In this case, chamber 11 has a second duct 14 equipped with a one way valve 15 that does not permit deflation of the tire. To avoid accidental deflation of the tire in case of leakage from chamber 11 and when device 1 is used for inflation, the pneumatic link between device 1 and the tire can be equipped with a one way valve 131. This valve 131 is placed at any point of said link, for example, at duct 13 as in FIGS. 1 to 4. However, it is preferably put at the valve on the rim of said tire.

Centrifugal mass 20 is axially symmetrical and is annular with a U-shaped axial section. Bottom 21 and sides 22 of the U form a cavity 23 inside said centrifugal mass 20. 0-ring seal 24 assures the airtightness between the two chambers 11 and 12.

The blocking means 30 of the centrifugal mass 20 comprises two balls 31 placed symmetrically in a wall of centrifugal mass 20 which is oriented along the axis of displacement. Each of the balls has a diameter greater than the thickness of said wall. Housings 32 in the centrifugal mass hold the balls and allow them to be traversely movable between positions where they are tangent to the inside or outside surfaces of said wall of centrifugal mass 20. Housings 32 have, on the side of cavity 23, a diameter less than that of balls 31 so that the balls cannot leave said housings 32.

Figure 2:
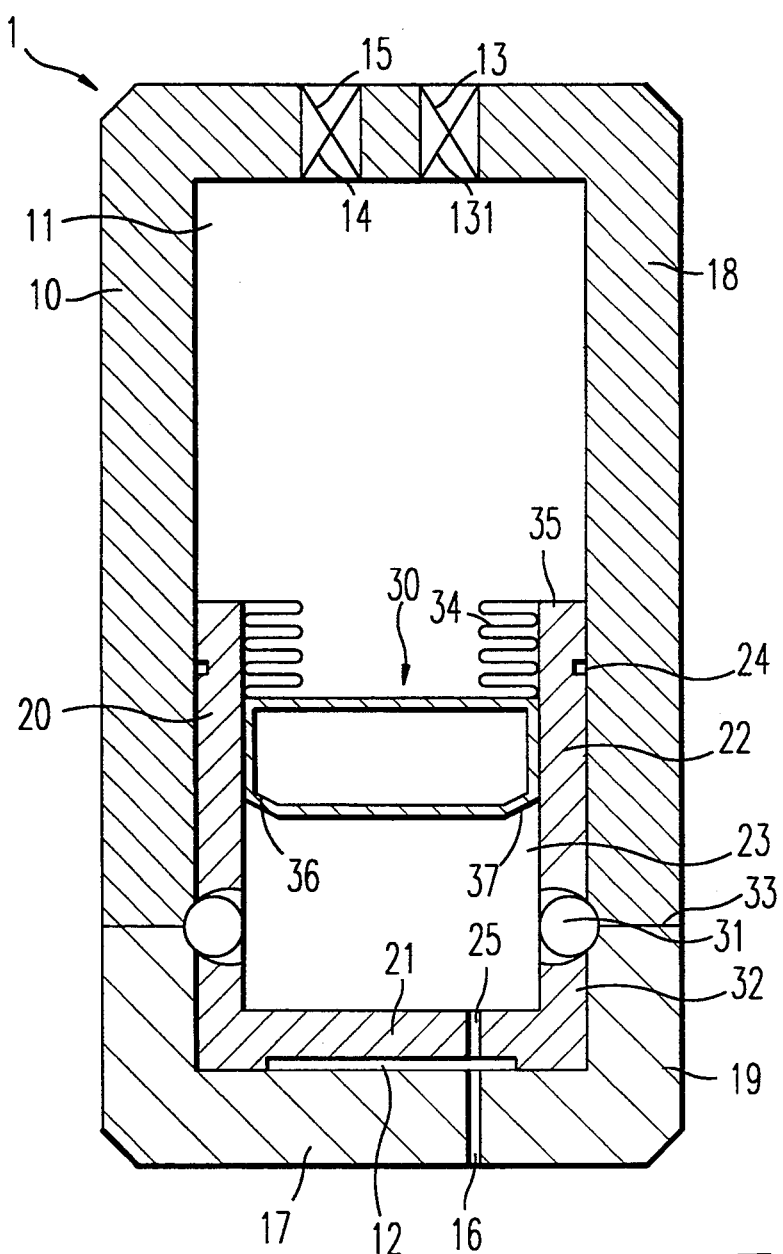
FIG. 2 is a view in section similar to FIG. 1, the tire being at the threshold inflation pressure.

A circumferential recess 33 is made circumferentially in the inside wall of stationary element 10 at such a position that the balls 31 may be embedded therein when centrifugal mass 20 is flattened against the bottom of stationary element 10 on the side of atmospheric chamber 12 with the balls 31 tangent to the inner surface of the wall of said centrifugal mass 20 (FIG. 2).

An elastic annular membrane 34 is connected in an airtight manner to end 35 of the wall of centrifugal mass 20 and is oriented along the axis of displacement, on the side of pressurized chamber 11. The elastic membrane 34 is ended by a blocking part 36 whose outside geometry is suited to that of bottom 21 of centrifugal mass 20. It has such a height that, placed against bottom 21 of said centrifugal mass 20, it covers housings 32 of the balls. Blocking part 36 has a beveled edge 37. Duct 25 goes through bottom 21 of centrifugal mass 20 and brings to atmospheric pressure the part of cavity 23 located between blocking part 36 and bottom 21 of centrifugal mass 20.

Stationary element 10 is made in two parts 18 and 19 assembled by adhesive bonding after the insertion of centrifugal mass 20 and blocking means 30. The selection of the materials of these two parts 18 and 19 is such that, when centrifugal mass 20 is in blocked position (FIG. 2), the center of gravity of said centrifugal mass 20 is always off-centered, relative to that of device 1, on the side of chamber 11.

Under-inflation warning device 1 is intended to be mounted on the wheel disk of a tire so that when the centrifugal mass is in blocked position, the center of gravity of the device 1 is on the rotational axis of the wheel of said tire. In the case of a standard wheel, the pneumatic connections are protected under a fitting. It is also possible to provide molded wheels incorporating device 1 in their design.

Figure 7:
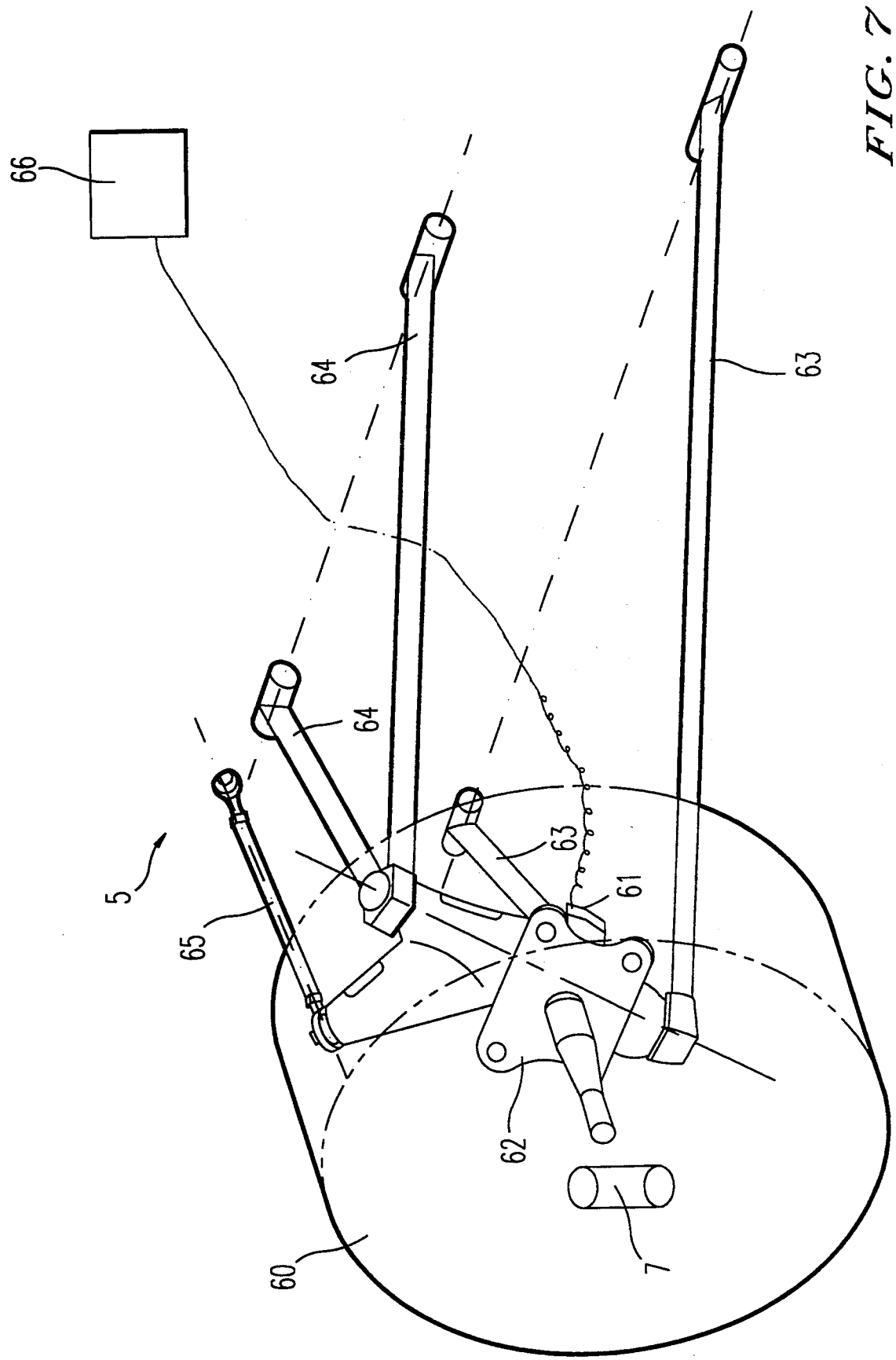
FIG. 7 shows the installation of the under-inflation warning system on a vehicle axle.

On the other hand, the device is mounted so that the axis of displacement is non-parallel with the rotational axis, e.g., transverse as seen in FIG. 7. Thus, the center of gravity of the device becomes off-centered from the rotational axis once the centrifugal mass is unblocked and moves to the position of FIG. 1, creating an imbalance.

The operation of under-inflation warning device 1 is now described with reference to FIGS. 1 and 2.

During inflation, as the inflation pressure rises to be greater than atmospheric pressure, and regardless of the orientation of device 1 relative to the vertical, centrifugal mass 20 is flattened by the inflation pressure against bottom 17 of stationary element 10 on the side of chamber 12, and elastic membrane 34 is gradually deployed in cavity 23.

When the inflation pressure becomes equal to a given threshold, beveled edge 37 of blocking part 36 pushes the two balls 31 into their housings 32 and embeds them in circumferential recess 33 of the wall of stationary element 10. Centrifugal mass 20 is thus blocked (FIG. 2). Finally, at a pressure close to, and above, said threshold pressure, blocking part 36 is flattened against bottom 21 of centrifugal mass 20.

During operation, the device 1 creates no imbalance while the centrifugal mass is blocked. However, when the inflation pressure drops close to the threshold pressure, the elastic membrane 34 shrinks and blocking part 36 moves away from bottom 21 of centrifugal mass 20. At the threshold pressure, the blocking part no longer embeds the two balls 31 in circumferential recess 33 made in the wall of said stationary element 10. Centrifugal mass 20 is then freed and, under the action of centrifugal forces due to the rolling of the tire and to the offset of the center of gravity of centrifugal mass 20 relative to the axis of the wheel, quickly becomes off-centered which creates an imbalance in the wheel (FIG. 1).

By way of example, if the nominal inflation pressure of the tire is on the order of two bars, the safety threshold pressure can be selected equal to 1.5 bars and the pressure of FIG. 2 close to 1.6 bars.

Blocking part 36 is made so that its weight is very low so that its inertia is insignificant and does not cause accidental unlocking following shocks.

Device 1 therefore makes it possible to create a dynamic imbalance in the wheel of the tire when the inflation pressure decreases below the safety threshold, and this imbalance causes vibrations which in their turn will warn the driver of the existence of the under-inflation. A particularly interesting advantage of device 1 is that it inhibits driving at a high and therefore dangerous speed because the vibrations transmitted by the steering to the driver are unbearable at high speed, while not prohibiting driving at moderate speed. The safety provided by this device 1 is therefore much greater than that provided by a simple warning in the dashboard, often disregarded by the drivers.

Figure 3:
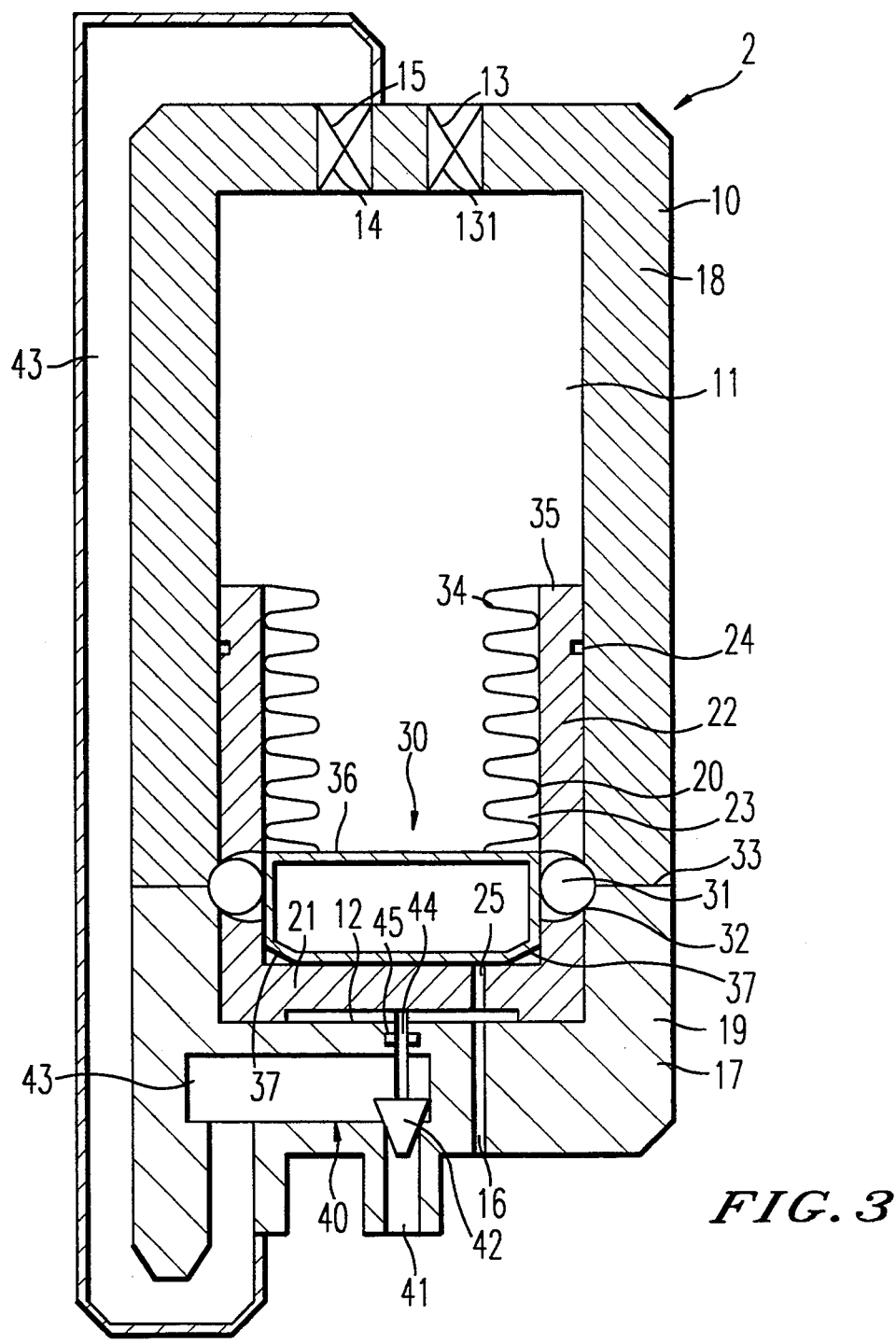
FIG. 3 is an axial view in section of a second under-inflation warning device equipped with a means for limiting the pressure during inflation, the tire being at its nominal inflation pressure.

An improvement to the preceding embodiment is shown in FIG. 3. This under-inflation warning device 2 is equipped with a means 40 for limiting inflation pressure during inflation.

Stationary element 10 of this second under-inflation warning device 2 also has an inflation air intake duct 41 which can be stopped by a needle valve 42, a line 43 connecting preceding air intake 41 to intake duct 14 of pressurized chamber 11. Needle valve 42 is extended by a rod 44 which goes through bottom 17 of stationary element 10 as well as bottom 21 of centrifugal mass 20 when the latter is flattened against bottom 17 by the inflation pressure. Seal 45 assures the airtightness between chamber 12 and line 43.

The operation of under-inflation warning device 2 is similar to that of device 1 with regard to the conditions of blocking and freeing centrifugal mass 20 as a function of the inflation pressure of the tire. The only difference is that the "pressure that is close" to the preceding threshold pressure is now the nominal pressure of the tire.

During inflation of the tire from air intake 41, the air intake pressure pushes back needle valve 42 and can thus enter chamber 11, and then the tire by duct 13. After having blocked centrifugal mass 20 at the inflation threshold pressure, blocking part 36 is applied against the end of rod 44 of needle valve 42 and gradually displaces said needle valve 42 until the closing of air intake 41 which occurs at the nominal inflation pressure of the tire.

Figure 4:
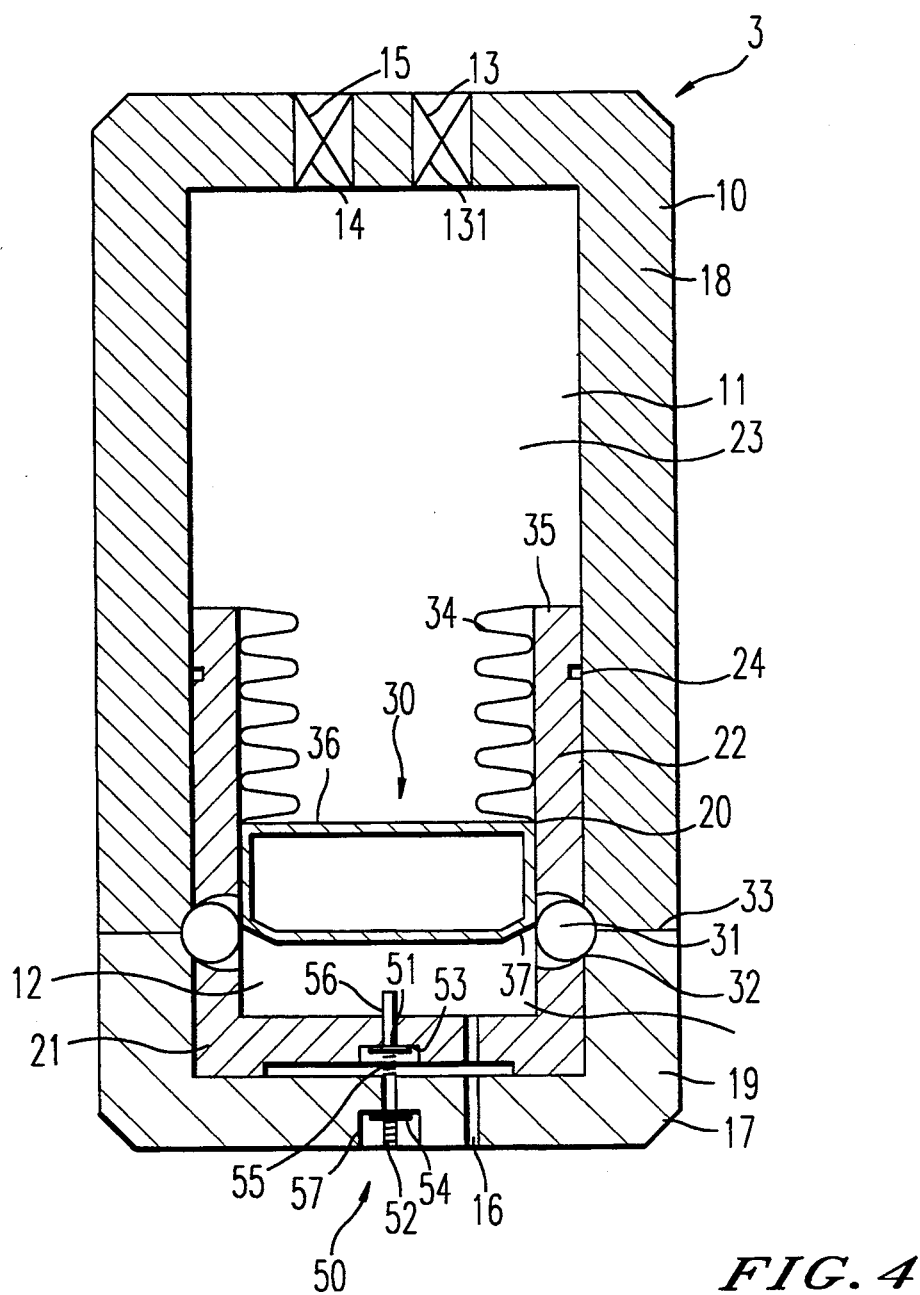
FIG. 4 is an axial view in section of an under-inflation warning device equipped with a visual warning means of the unblocking of the centrifugal mass.

FIG. 4 shows a second improvement in equipping under-inflation warning device 1 with a warning means of the unblocking of centrifugal mass 20. This under-inflation warning device 3 is equipped with a visual warning means 50 of the unblocking of centrifugal mass 20.

Visual warning means 50 comprises a rod 51 going through bottom 17 of stationary element 10 as well as bottom 21 of centrifugal mass 20 when said centrifugal mass 20 is flattened against bottom 17. It terminates toward the outside of device 3, by a bright-colored insert 52. The displacement of said rod 51 is limited by two stops 53 and 54 on both sides of bottom 17 of stationary element 10, as well as by a return spring 55 placed between stop 53 and the inner side of bottom 17.

When the inflation pressure of the tire is greater than the threshold pressure and thus centrifugal mass 20 is blocked, blocking part 36 rests on inner end 56 of rod 51 and pushes insert 52 toward the outside of device 3. The insert 52 is completely out when blocking part 36 is flattened against bottom 21 of centrifugal mass 20 or when the inflation pressure is equal to the preceding "pressure that is close." When the inflation pressure decreases below this "pressure that is close" to the preceding inflation threshold, elastic membrane 34 shrinks, blocking part 36 moves away from bottom 17 of the stationary element and thus makes it possible for return spring 55 to return rod 51 inward. Insert 52 is then hidden in recess 57. This insert 52 is therefore an indicator of the correct inflation of the tire and its withdrawing indicates an insufficient pressure, whether centrifugal mass 20 is off-centered or not.

Figure 5:
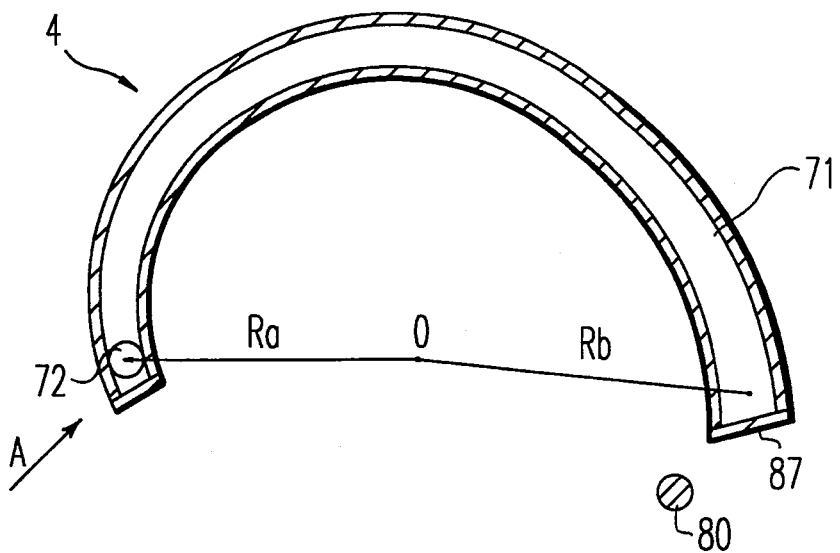
FIG. 5 represents a view in section of a second embodiment according to the invention.
Figure 6:
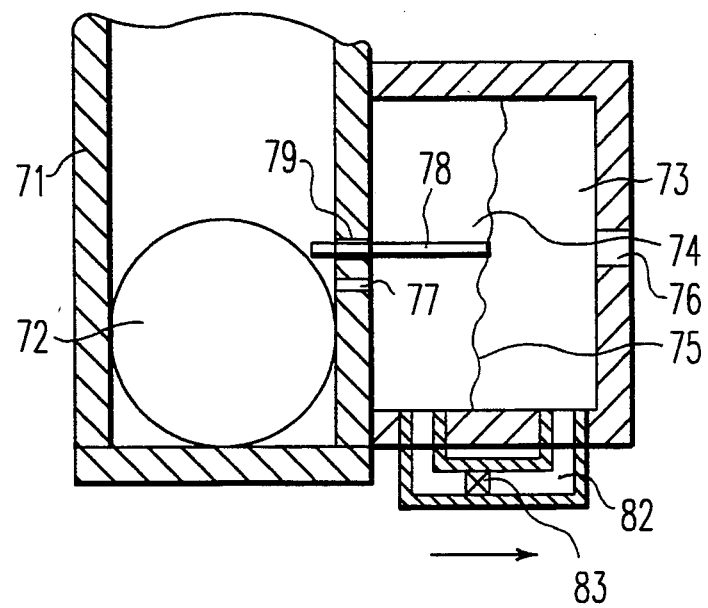
FIG. 6 is a view in section as indicated along arrow A in FIG. 5 of the locking means of the centrifugal mass of the second embodiment.

FIGS. 5 and 6 shows another embodiment according to the invention. Device 4 comprises a tubular stationary element 71 placed spirally around point 0. Inside of stationary element 71 can be displaced a ball 72 as the centrifugal mass. At the end of stationary element 71 closest to point 0, at a distance $R_a$, there is a blocking device (90) for ball 72. This blocking device (FIG. 6) comprises two chambers 73 and 74 separated by an airtight elastic membrane 75. Chamber 73 is connected to the tire by duct 76 and is therefore at the inflation pressure of the tire. Chamber 74 is in communication with the pressure in stationary element 71 by duct 77. Its pressure is thus normally equal to the atmospheric pressure. A rod 78 is attached to elastic membrane 75 and is pushed through hole 79 in stationary element 71 when the pressure difference between two chambers 73 and 74 is sufficient to block any displacement of ball 72.

A mass 80 is placed on the wheel at the side of stationary element 71 farthest from point 0, at a distance $R_b$, to balance device 4 and to assure that when ball 72 is in the blocked position, its center of gravity is at 0.

This device 4 can advantageously also be used to inflate the tire by use of a valve 81 placed at the end 80 of stationary element 71 farthest from point 0. Also a duct 82 connects the two chambers 73 and 74 and is equipped with a one way valve 83.

During inflation, the air flow going through stationary element 71 flattens the ball against the end of said stationary element 71 closest to point 0. As soon as the tire is correctly inflated, the opening of valve 81 brings the pressure in chamber 73 to the atmospheric pressure, chamber 74 remaining at the inflation pressure of the tire. The pressure difference between the two chambers deforms membrane 75, pushes back rod 78 into stationary element 71 and blocks ball 72.

Membrane 75 is calibrated to free ball 72 as soon as the inflation pressure becomes less than a given threshold pressure. The centrifugal forces due to driving then immediately displace ball 72 to the other end of stationary element 71 because of the radius difference. As above, this displacement causes the appearance of a dynamic imbalance felt by the driver.

As above, this device 4 is provided to be mounted on a tire wheel, between the rim and the wheel disk, by using suitable and known mounting means so that when ball 72 is in blocked position, the center of gravity of the device is on the rotational axis of said wheel.

Another improvement of the invention consists in using any of preceding under-inflation warning devices 1, 2, 3, 4 in combination with a vibration sensor 61 placed on a wheel-carrier 62 of the wheel of the tire.

FIG. 7 shows the suspension elements of a steered wheel: wheel-carrier 62, lower suspension arm 63, upper suspension arm 64, steering rod 65 and tire and wheel unit 60 equipped with an under-inflation warning device 1, 2, 3 or 4. Vibration sensor 61 can be placed on any of the suspension elements of the vehicle: lower arm 63, upper arm 64, steering rod 65 and wheel-carrier 62. The arrangement on wheel-carrier 62 is preferable, however, because the data transmitted by sensor 61 is then the least filtered. The measurements of sensor 61 are transmitted to a central control package 66 connected to four warning systems 5 of the vehicle. The measurements are then analyzed and the warnings transmitted to the driver by known means.

The easy detection by vibration sensor 61 of the dynamic imbalance induced by the preceding under-inflation warning devices 1, 2, 3, 4 allows the reduction of the detectable imbalance threshold and thus a miniaturization of said warning devices 1, 2, 3, 4.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A device for warning of the under-inflation of a pneumatic tire when the pneumatic tire is mounted to a wheel, comprising means mountable to one of the vehicle wheel and tire for creating an imbalance in the wheel sufficient to alert a driver of a vehicle to which the wheel is mounted of the under-inflation of the tire, by vibrations arising due to the imbalance, only when an inflation pressure of the tire is below a given threshold pressure.

2. The device of claim 1, wherein said imbalance creating means includes a mass movable between a blocked position and an unblocked position, and blocking means for blocking movement of said mass at the blocked position and for unblocking said mass only when the inflation pressure is below the given threshold.

3. The device of claim 2 including means for warning that the mass is unblocked.

4. The device of claim 1, wherein said device comprises:

a hollow stationary element mountable to one of the vehicle wheel and tire;

a mass slidably mounted in said stationary element for movement between a blocked position and an unblocked position and dividing the interior of said stationary element into a first chamber at the tire inflation pressure and a second chamber at atmospheric pressure; and blocking means for blocking movement of said mass at the blocked position and for unblocking said mass when the tire inflation pressure drops below the threshold pressure, wherein when the device is mounted such that the center of gravity thereof is at a wheel rotational center when the mass is at the blocked position, the movement of the mass to the unblocked position due to centrifugal force creates an imbalance in the wheel.

5. The device of claim 1, including means for limiting tire inflation pressure.

6. A device for warning of the under-inflation of a pneumatic tire when the pneumatic tire is mounted to a wheel, comprising means mounted to the wheel for creating an imbalance in the wheel sufficient to alert a driver of a vehicle to which the wheel is mounted of the under-inflation of the tire, by vibrations arising due to the imbalance, only when an inflation pressure of the tire is below a given threshold pressure.

7. The device of claim 6, wherein said imbalance creating means includes a mass movable between a blocked position and an unblocked position, and blocking means for blocking movement of said mass at the blocked position and for unblocking said mass only when the inflation pressure is below the given threshold, wherein the device is mounted to the wheel such that the center of gravity thereof is at a wheel rotational center when the mass is at the blocked position, whereby movement of the mass to the unblocked position due to centrifugal force creates an imbalance in the wheel.

8. The device of claim 7 including a spiral tubular stationary element positioned around the rotational center of the wheel such that one end of the stationary element is closer to the rotational center than is the other end.

9. The device of claim 8 wherein said mass is a ball and said blocking means comprise:

a chamber adjacent said one end and subject to tire inflation pressure;

a membrane in said chamber and movable as a function of a pressure difference between said tire inflation pressure and atmospheric pressure; and a rod extending into said one end and engageable with said ball to block said ball at said one end, said rod being movable with said membrane.

10. The device of claim 6, wherein said device comprises:

a hollow stationary element mounted to the vehicle wheel;

a mass slidably mounted in said stationary element for movement between a blocked position and an unblocked position and dividing the interior of the stationary element into a first chamber at the tire inflation pressure and a second chamber at atmospheric pressure; and blocking means for blocking movement of said mass at the blocked position and for unblocking said mass when the tire inflation pressure drops below the threshold pressure, wherein the device is mounted to the wheel such that the center of gravity thereof is at a wheel rotational center when the mass is at the blocked position, whereby movement of the mass to the unblocked position due to centrifugal force creates an imbalance in the wheel.

11. The device of claim 10, wherein the center of gravity of the mass is offset from the center of gravity of the device, and on the side of the first chamber, when the mass is at the blocked position.

12. The device of claim 11, wherein said mass has a U-shaped section in a plane comprising an axis of displacement of the mass, including a bottom at an end of the mass closest to said second chamber, and wherein said blocking means comprise:

at least one ball positioned in a wall of said mass which is oriented along the axis of displacement, said ball having a diameter greater than a thickness of said mass wall and being movable in said mass wall such that the ball can selectively extend out from said mass wall;

at least one recess in the wall of said stationary element at such a position that the ball can extend into said recess when said mass is at the blocked position;

a blocking part fitted in said mass and movable to a blocking position close to said bottom of said mass for blocking movement of the at least one ball and to prevent the at least one ball from moving out of said recess when said mass is at the blocked position; and an elastic element airtightly extending between said blocking part and said mass so that said blocking part moves in said mass as a function of a pressure difference between said first and second chambers.

13. The device of claim 12, wherein said elastic element comprises a diaphragm connected between said blocking part and said mass.

14. The device of claim 13 including means for limiting tire inflation pressure.

15. The device of claim 14 wherein said inflation pressure limiting means comprise:

an inflation air intake duct in said stationary element; and a valve, including a rod, in said stationary element for closing said intake duct, wherein said blocking part presses on said rod to close the intake duct when the blocking part is at the blocking position.

16. The device of claim 6 wherein the wheel is mounted to a wheel carrier of a vehicle and including a vibration sensor mounted to the wheel carrier.

17. A wheel including a device for warning of the under-inflation of a pneumatic tire when the pneumatic tire is mounted to the wheel, the device comprising means mounted to the wheel for creating an imbalance in the wheel sufficient to alert a driver of a vehicle to which the wheel is mounted of the under-inflation of the tire, by vibrations arising due to the imbalance, only when an inflation pressure of the tire is below a given threshold pressure.

18. The wheel of claim 17 mounted to a vehicle, including a vibration detector on a wheel carrier of the vehicle.

19. The wheel of claim 17, wherein said imbalance creating means includes a mass movable between a blocked position and an unblocked position, and blocking means for blocking movement of said mass at the blocked position and for unblocking said mass only when the inflation pressure is below the given threshold, wherein the device is mounted such that the center of gravity thereof is at a wheel rotational center when the mass is at the blocked position, whereby the movement of the mass to the unblocked position due to centrifugal force creates an imbalance in the wheel.

20. The wheel of claim 17, including a spiral tubular stationary element positioned around the rotational center of the wheel such that one end of the stationary element is closer to the rotational center than is the other end.

* * * * *